US010348546B2

(12) United States Patent
Tong et al.

(10) Patent No.: US 10,348,546 B2
(45) Date of Patent: Jul. 9, 2019

(54) TRANSMISSION APPARATUS AND RECEPTION APPARATUS

(71) Applicant: KYOCERA CORPORATION, Kyoto (JP)

(72) Inventors: Fangwei Tong, Machida (JP); Chiharu Yamazaki, Tokyo (JP); Kugo Morita, Higashiomi (JP); Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 72 days.

(21) Appl. No.: 15/682,686

(22) Filed: Aug. 22, 2017

(65) Prior Publication Data

US 2017/0353344 A1    Dec. 7, 2017

Related U.S. Application Data

(63) Continuation of application No. PCT/JP2016/054076, filed on Feb. 12, 2016.

(30) Foreign Application Priority Data

Feb. 23, 2015 (JP) ................................ 2015-032721

(51) Int. Cl.
*H04L 5/02* (2006.01)
*H04L 27/34* (2006.01)
(Continued)

(52) U.S. Cl.
CPC ............... *H04L 27/34* (2013.01); *H04L 5/06* (2013.01); *H04L 27/0008* (2013.01);
(Continued)

(58) Field of Classification Search
CPC . H04L 27/34; H04L 27/3488; H04L 27/0008; H04L 5/06; H04W 28/04; H04W 4/06
See application file for complete search history.

(56) References Cited

U.S. PATENT DOCUMENTS

2005/0169391 A1* 8/2005 Takeda .................. H04L 1/0003
375/259
2006/0168504 A1* 7/2006 Meyer .................. H04L 1/0026
714/799
(Continued)

FOREIGN PATENT DOCUMENTS

JP    2013-009290 A    1/2013

OTHER PUBLICATIONS

International Search Report issued in PCT/JP2016/054076; dated Mar. 22, 2016.
(Continued)

*Primary Examiner* — Jay P Patel
(74) *Attorney, Agent, or Firm* — Studebaker & Brackett PC

(57) ABSTRACT

A base station 100 in a radio transmission system that performs multicast/broadcast transmission comprises a multiplexing unit 110 configured to multiplex a plurality of types of transmission data transmitted in schemes different in error tolerance; and a transmitter 120 configured to transmit multiplexed data obtained by the multiplexing unit 110, by multicast/broadcast. The plurality of types of transmission data includes basic transmission data transmitted, by the transmitter, in a scheme having a first error tolerance and additional transmission data transmitted, by the transmitter, in a scheme having a second error tolerance lower than the first error tolerance. The additional transmission data is utilized in a terminal 200 by being combined with the basic transmission data.

18 Claims, 10 Drawing Sheets

(51) Int. Cl.
*H04W 4/06* (2009.01)
*H04W 28/04* (2009.01)
*H04L 5/06* (2006.01)
*H04L 27/00* (2006.01)

(52) U.S. Cl.
CPC ........... *H04L 27/3488* (2013.01); *H04W 4/06* (2013.01); *H04W 28/04* (2013.01)

(56) References Cited

U.S. PATENT DOCUMENTS

| | | | |
|---|---|---|---|
| 2007/0183442 A1* | 8/2007 | Shibata | H04B 1/707 370/437 |
| 2008/0192726 A1* | 8/2008 | Mahesh | H04L 12/6418 370/349 |
| 2008/0311854 A1* | 12/2008 | Kubo | H04B 17/309 455/67.11 |
| 2009/0196165 A1* | 8/2009 | Morimoto | H04J 11/0079 370/208 |
| 2009/0296925 A1* | 12/2009 | Kishiyama | H04L 5/0026 380/33 |
| 2010/0034076 A1* | 2/2010 | Kishiyama | H04J 11/005 370/210 |
| 2010/0103890 A1* | 4/2010 | Ishii | H04L 5/0048 370/329 |
| 2010/0177688 A1* | 7/2010 | Kishiyama | H04J 13/004 370/328 |
| 2010/0189022 A1* | 7/2010 | Pelletier | H04W 52/0225 370/311 |
| 2010/0316162 A1* | 12/2010 | Higuchi | H04L 27/2623 375/295 |
| 2011/0222415 A1* | 9/2011 | Ramamurthi | H04L 1/0003 370/252 |
| 2011/0222619 A1* | 9/2011 | Ramamurthi | H04L 27/0008 375/267 |
| 2014/0044091 A1 | 2/2014 | Kishiyama | |
| 2015/0139120 A1* | 5/2015 | ElArabawy | H04L 5/0057 370/329 |
| 2015/0318969 A1* | 11/2015 | Morioka | H04L 5/0048 370/336 |
| 2015/0327185 A1* | 11/2015 | Morioka | H04L 5/0048 370/336 |

OTHER PUBLICATIONS

Huawei, HiSilicon; New Study Item Proposal for Support of single-cell point-to-multipoint transmission in LTE; 3GPP TSG RAN Meeting #66; RP-142205; Dec. 8-11, 2014; pp. 1-6; Maui, Hawaii, USA.

* cited by examiner

FIG. 6

TRANSMISSION APPARATUS AND RECEPTION APPARATUS

RELATED APPLICATIONS

This application is a continuation application of international application PCT/JP2016/054076 (filed Feb. 12, 2016), which claims benefit of Japanese Patent Application No. 2015-032721 (filed on Feb. 23, 2015), the entirety of both applications hereby expressly incorporated by reference.

TECHNICAL FIELD

The present application relates to a transmission apparatus and a reception apparatus in a radio transmission system.

BACKGROUND ART

In a radio transmission system, known is a multicast/broadcast (Point To Multipoint (PTM)) delivery in which a transmission apparatus uses an identical radio resource to transmit identical delivery data to a plurality of reception apparatuses (for example, see Non Patent Document 1). The multicast/broadcast delivery can improve a utilization efficiency of a radio resource compared to a unicast delivery.

In the multicast/broadcast delivery, there may be a reception apparatus under a poor propagation environment among the plurality of reception apparatuses configured to receive the delivery data from the transmission apparatus. For this reason, it is common for the transmission apparatus to transmit delivery data having an error tolerance adapted to the poor propagation environment (that is, low-rate delivery data), so that the plurality of reception apparatuses can correctly receive the delivery data.

PRIOR ART DOCUMENT

Non-Patent Document

Non Patent Document 1; 3GPP contribution "RP-142205"

SUMMARY

A transmission apparatus according to a first aspect is a transmission apparatus in a radio transmission system that performs multicast/broadcast transmission. The transmission apparatus comprises a multiplexing unit configured to multiplex a plurality of types of transmission data transmitted in schemes different in error tolerance; and a transmitter configured to transmit multiplexed data obtained by the multiplexing unit, by multicast/broadcast. The plurality of types of transmission data includes basic transmission data transmitted, by the transmitter, in a scheme having a first error tolerance and additional transmission data transmitted, by the transmitter, in a scheme having a second error tolerance lower than the first error tolerance. The additional transmission data is utilized in a reception apparatus by being combined with the basic transmission data.

A reception apparatus according to a second aspect is a reception apparatus in a radio transmission system that performs multicast/broadcast transmission. The reception apparatus comprises a receiver configured to receive multiplexed data obtained by multiplexing a plurality of types of transmission data transmitted in a scheme different in error tolerance. The multiplexed data is transmitted by multicast/broadcast from a transmission apparatus. The plurality of types of transmission data includes basic transmission data transmitted, by the transmission apparatus, in a scheme having a first error tolerance and additional transmission data transmitted, by the transmission apparatus, in a scheme having a second error tolerance lower than the first error tolerance. The additional transmission data is utilized by being combined with the basic transmission data.

BRIEF DESCRIPTION OF THE DRAWINGS

FIG. 6 is a diagram illustrating a 64 QAM constellation.

DESCRIPTION OF EMBODIMENT

Overview of Embodiment

Figure 1:
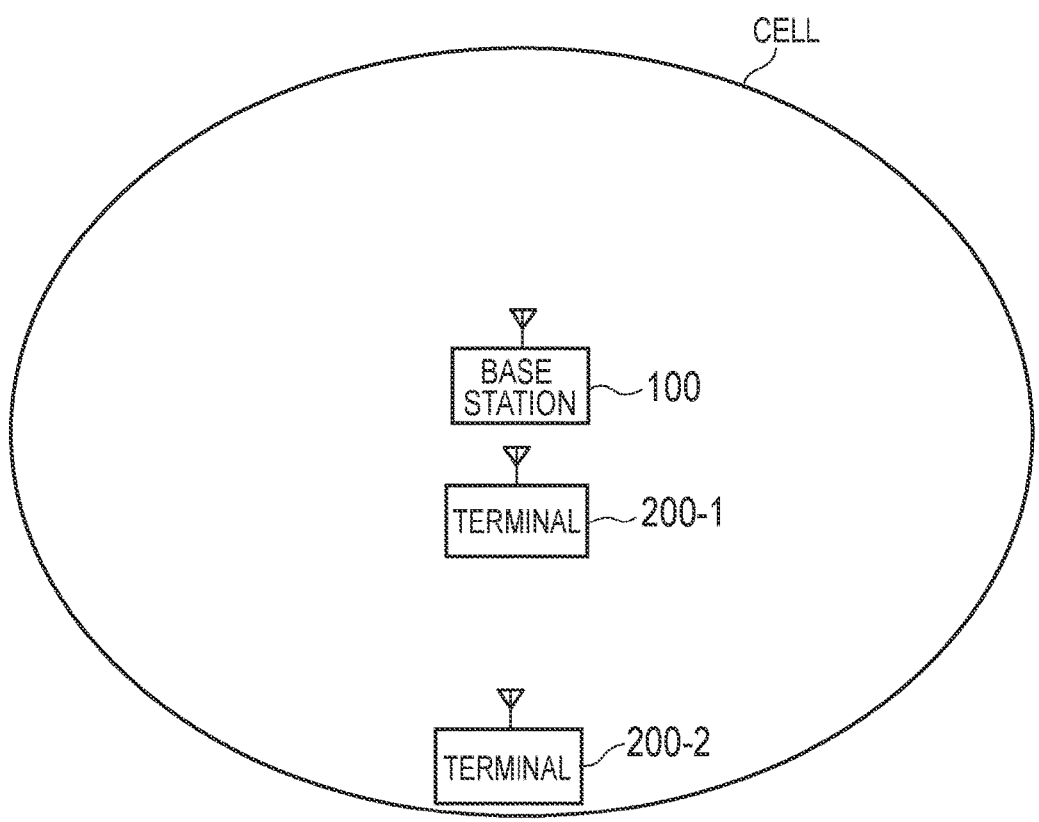
FIG. 1 is a diagram illustrating a radio transmission system according to a first embodiment.

In spite of the forgoing, in a multicast/broadcast delivery, there may be also a reception apparatus under a good propagation environment among a plurality of reception apparatuses configured to receive delivery data from a transmission apparatus. Such a reception apparatus, which is in a state capable of correctly receiving delivery data with a high rate, can only receive delivery data with a low rate from the transmission apparatus.

That is, there is a problem in which the multicast/broadcast delivery cannot improve service quality for the reception apparatus under a good propagation environment.

Therefore, the present embodiment provides, a transmission apparatus and a reception apparatus capable of improving the service quality in the multicast/broadcast delivery.

According to the present embodiment, the quality of service in multicast/broadcast distribution can be improved.

A transmission apparatus according to first to fourth embodiments is a transmission apparatus in a radio transmission system that performs multicast/broadcast transmission. The transmission apparatus comprises a multiplexing unit configured to multiplex a plurality of types of transmission data transmitted in schemes different in error tolerance; and a transmitter configured to transmit multiplexed data obtained by the multiplexing unit, by multicast/broadcast. The plurality of types of transmission data includes basic transmission data transmitted, by the transmitter, in a scheme having a first error tolerance and additional transmission data transmitted, by the transmitter, in a scheme having a second error tolerance lower than the first error tolerance. The additional transmission data is utilized in a reception apparatus by being combined with the basic transmission data.

In the first to fourth embodiments, the first error tolerance is an error tolerance adapted to a poor propagation environment, and the second error tolerance is an error tolerance adapted to a good propagation environment.

In the first embodiment, the multiplexing unit multiplexes the basic transmission data and the additional transmission data in a power region. The additional transmission data is applied with a transmission power lower than a transmission power adapted to the basic transmission data.

In the second embodiment, the multiplexing unit comprises a bit combination unit configured to repeatedly generate bit strings including the basic transmission data and the additional transmission data; and a modulation unit configured to perform mapping to a symbol for each of the bit strings generated by the bit combination unit by using a predetermined modulation scheme. The bit combination unit repeatedly includes the identical basic transmission data into the bit strings so that the bit strings including the identical basic transmission data are mapped to a plurality of consecutive symbols.

In the second embodiment, the predetermined modulation scheme is the same as a first modulation scheme used by a reception apparatus under a good propagation environment, and different from a second modulation scheme used by a reception apparatus under a poor propagation environment. The second modulation scheme is a modulation scheme with a fewer number of bits transmitted per each symbol than the predetermined modulation scheme.

In the second embodiment, the bit combination unit fixes a bit position of the basic transmission data in the bit string at a specific bit position so that the plurality of consecutive symbols are arranged at signal points adjacent on an IQ plane.

In the third embodiment, the transmission apparatus comprises a first coding unit configured to code the basic transmission data to generate coded basic transmission data; and a second coding unit configured to code the additional transmission data to generate coded additional transmission data. The multiplexing unit comprises a bit combination unit configured to generate a bit string including the coded basic transmission data and the coded additional transmission data; and a modulation unit configured to perform mapping of the bit string to a symbol by using a predetermined modulation scheme. The additional transmission data is applied with a coding scheme lower in error tolerance than a coding scheme applied to the basic transmission data.

In the fourth embodiment, the multiplexing unit multiplexes the basic transmission data and the additional transmission data in a frequency region. The additional transmission data is applied with a coding and/or modulation scheme lower in error tolerance than a coding and/or modulation scheme applied to the basic transmission data.

In a modification of the fourth embodiment, the multiplexing unit multiplexes the basic transmission data and the additional transmission data in a time region. The additional transmission data is applied with a coding and/or modulation scheme lower in error tolerance than a coding and/or modulation scheme applied to the basic transmission data.

In other embodiments, ARQ and/or HARQ is applied to the basic transmission data only, out of the basic transmission data and the additional transmission data.

In other embodiments, repetitive transmission is applied to the basic transmission data only, out of the basic transmission data and the additional transmission data.

A reception apparatus according to the first to fourth embodiments is a reception apparatus in a radio transmission system that performs multicast/broadcast transmission. The reception apparatus comprises a receiver configured to receive multiplexed data obtained by multiplexing a plurality of types of transmission data transmitted in a scheme different in error tolerance. The multiplexed data is transmitted by multicast/broadcast from a transmission apparatus. The plurality of types of transmission data includes basic transmission data transmitted, by the transmission apparatus, in a scheme having a first error tolerance and additional transmission data transmitted, by the transmission apparatus, in a scheme having a second error tolerance lower than the first error tolerance. The additional transmission data is utilized by being combined with the basic transmission data.

In the first to fourth embodiments, the first error tolerance is an error tolerance adapted to a poor propagation environment. The second error tolerance is an error tolerance adapted to a good propagation environment.

In the first embodiment, the basic transmission data and the additional transmission data are multiplexed in a power region. A transmission power applied to the additional transmission data is lower than a transmission power applied to the basic transmission data.

In the first embodiment, when the reception apparatus is under a good propagation environment, the reception apparatus comprises a separation unit configured to separate the multiplexed data into the basic transmission data and the additional transmission data; and a decoding unit configured to decode the basic transmission data and the additional transmission data separated by the separation unit. The separation unit is configured to execute a first process of extracting the basic transmission data from the multiplexed data while considering the additional transmission data as noise; and a second process of extracting the additional transmission data included in the multiplexed data by canceling the basic transmission data included in the multiplexed data with a use of a replica of the basic transmission data.

In the second embodiment, the multiplexed data includes a symbol obtained by a predetermined modulation scheme. The symbol is mapped to a bit string including the basic transmission data and the additional transmission data. A plurality of consecutive symbols are mapped to the bit string including the identical basic transmission data.

In the second embodiment, when the reception apparatus is under a good propagation environment, the reception apparatus comprises a demodulation unit configured to demodulate the bit string for each of the symbols by using the predetermined modulation scheme; and a separation unit configured to separate the bit string into the basic transmission data and the additional transmission data.

In the second embodiment, when the reception apparatus is under a poor propagation environment, the reception apparatus comprises a composite operation unit configured to generate a composite symbol by performing a composite operation on the plurality of consecutive symbols; and a demodulation unit configured to demodulate the composite symbol in accordance with the second modulation scheme different from the predetermined modulation scheme. The second modulation scheme is a modulation scheme with a fewer number of bits transmitted per each symbol than the predetermined modulation scheme. The plurality of consecutive symbols are arranged at a signal point adjacent on an IQ plane.

In the third embodiment, the multiplexed data includes a symbol obtained by a predetermined modulation scheme. The symbol is mapped to a bit string including coded basic transmission data obtained by coding the basic transmission data and coded additional transmission data obtained by coding the additional transmission data. The additional transmission data is applied with a coding scheme lower in error tolerance than a coding scheme applied to the basic transmission data.

In the third embodiment, the reception apparatus comprises a demodulation unit configured to demodulate the bit string for each of the symbols by the predetermined modulation scheme; a separation unit configured to separate the bit string into the coded basic transmission data and the coded additional transmission data; a first decoding unit configured to decode the coded basic transmission data; and a second decoding unit configured to decode the coded additional transmission data.

In the fourth embodiment, the basic transmission data and the additional transmission data are multiplexed in a frequency region. The additional transmission data is applied with a coding and/or modulation lower in error tolerance than a coding and/or modulation scheme applied to the basic transmission data.

In the modification of the fourth embodiment, the basic transmission data and the additional transmission data are multiplexed in a time region. The additional transmission data is applied with a coding and/or modulation lower in error tolerance than a coding and/or modulation scheme applied to the basic transmission data.

In other embodiments, ARQ and/or HARQ is applied to the basic transmission data only, out of the basic transmission data and the additional transmission data.

In other embodiments, repetitive transmission is applied to the basic transmission data only, out of the basic transmission data and the additional transmission data.

First Embodiment (Overview of Radio Transmission System)

FIG. 1 is a diagram illustrating a radio transmission system according to the first embodiment. The radio transmission system according to the first embodiment is a mobile communication system based on the 3GPP (Third Generation Partnership Project) standard.

As illustrated in FIG. 1, the radio transmission system according to the first embodiment includes a base station 100, a terminal 200-1, and a terminal 200-2. In the first embodiment, the base station 100 corresponds to a transmission apparatus, and each of the terminal 200-1 and the terminal 200-2 corresponds to a reception apparatus.

The base station 100 forms a cell. The terminal 200-1 is positioned near a center of the cell, that is, in the vicinity of the base station 100. In other words, the terminal 200-1 is under a good propagation environment. On the other hand, the terminal 200-2 is positioned near an edge of the cell, that is, in a distance from the base station 100. In other words, the terminal 200-2 is under a poor propagation environment.

The base station 100 uses an identical radio resource (time-frequency resource) to perform a multicast/broadcast (Point to Multipoint (PTM)) transmission for transmitting identical transmission data to a plurality of the terminals 200. The multicast/broadcast transmission can improve a utilization efficiency of a radio resource compared to a unicast transmission.

In the first embodiment, a case is mainly assumed where the base station 100 performs a data transmission in units of cell. Such a method may be referred to as a single cell PTM (SCPTM) transmission. The SCPTM transmission differs from an MBMS (Multimedia Broadcast Multicast Service) in which data transmission is performed in units of areas formed of a plurality of cells in that the data transmission is performed in units of cells. However, the base station 100 may perform the data transmission by the MBMS.

(Transmission Apparatus and Reception Apparatus According to First Embodiment)

Figure 2:
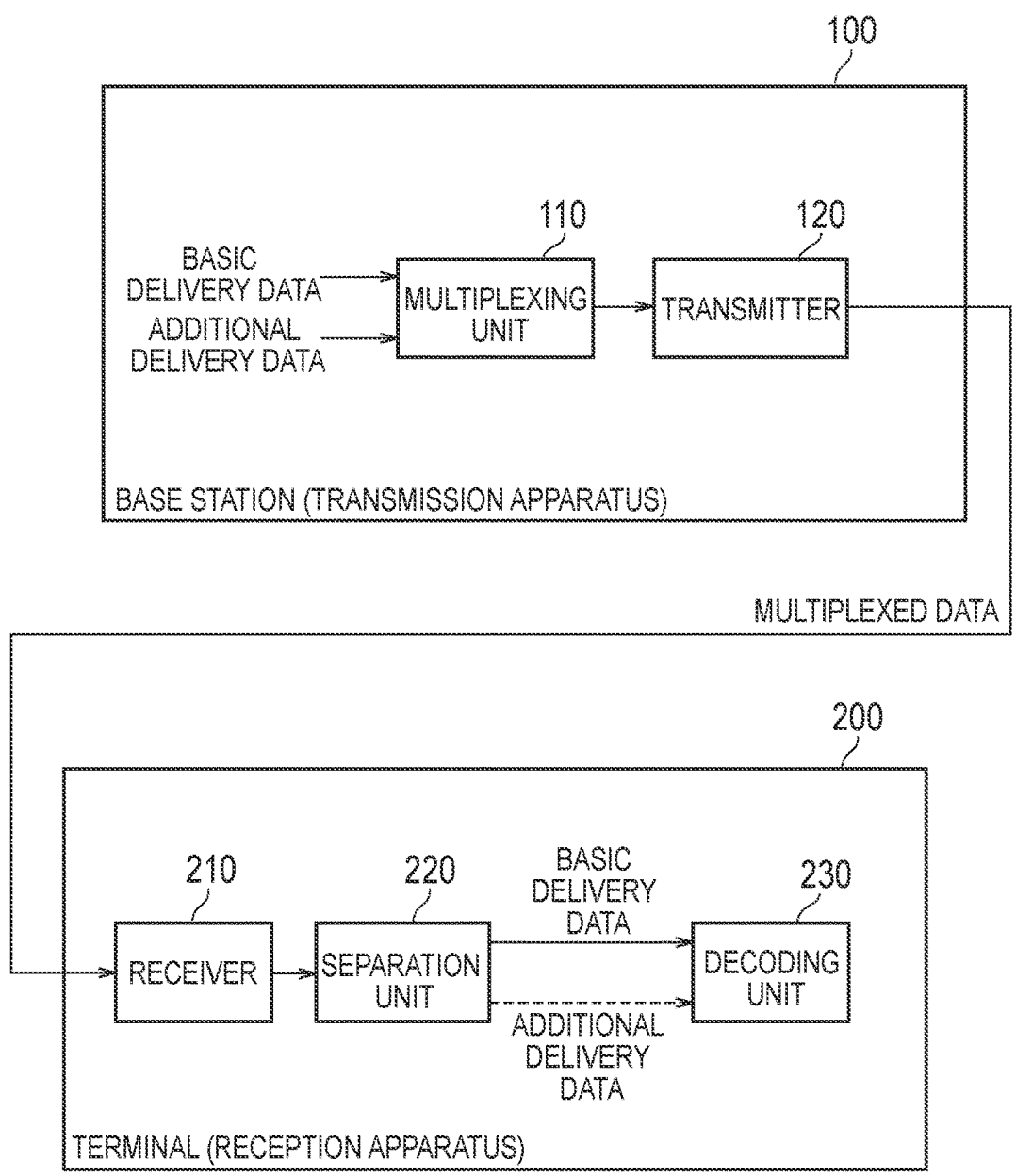
FIG. 2 is a block diagram of a transmission apparatus (base station) and a reception apparatus (terminal) according to the first embodiment.

FIG. 2 is a block diagram of the transmission apparatus (base station 100) and the reception apparatus (terminal 200) according to the first embodiment.

(1) Transmission Apparatus

The transmission apparatus (base station 100) according to the first embodiment will be described, below.

As illustrated in FIG. 2, the base station 100 includes a multiplexing unit 110 configured to multiplex a plurality of types of data transmitted in a scheme different in the error tolerance, and a transmitter 120 configured to transmit, by multicast/broadcast, the multiplexed data obtained by the multiplexing unit 110.

The plurality of types of transmission data include basic transmission data transmitted in a scheme having a first error tolerance, and additional transmission data transmitted in a scheme having a second error tolerance lower than the first error tolerance. The first error tolerance is an error tolerance adapted to a poor propagation environment. The second error tolerance is an error tolerance adapted to a good propagation environment.

The additional transmission data is utilized in combination with the basic transmission data in the terminal 200. It is noted that the basic transmission data and the additional transmission data may be coded. A specific example of the basic transmission data and the additional transmission data will be described, below.

In the first embodiment, the multiplexing unit 110 multiplexes the basic transmission data and the additional transmission data in the power region. In other words, the identical radio resource (time-frequency resource) is used for transmission of the basic transmission data and the additional transmission data, and a different transmission power is used for transmission of the basic transmission data and the additional transmission data.

Here, the transmission power lower than the transmission power applied to the basic transmission data is applied to the additional transmission data. As a result, the error tolerance of the additional transmission data (second error tolerance) is lower than the error tolerance of the basic transmission data (first error tolerance).

Further, the first error tolerance is the error tolerance adapted to a poor propagation environment, and thus, the terminal 200-2 under a poor propagation environment can correctly receive the basic transmission data. However, the terminal 200-2 cannot correctly receive the additional transmission data.

The second error tolerance is the error tolerance adapted to a good propagation environment, and thus, the terminal 200-1 under a good propagation environment can correctly receive the additional transmission data. Further, the terminal 200-1 can correctly also receive the basic transmission data.

As a result, each of the terminals 200-1 and 200-2 can correctly receive the basic transmission data and utilize the basic transmission data. As a result, it is possible to maintain a minimum required service quality.

Further, the terminal 200-1 can correctly receive not only the basic transmission data, but also the additional transmission data, and utilize the basic transmission data and the additional transmission data. The additional transmission data is utilized in combination with the basic transmission data in the terminal 200-1. As a result, it is possible to improve the service quality for the reception apparatus (terminal 200-1) under a good propagation environment.

(2) Reception Apparatus

The reception apparatus (terminal 200) according to the first embodiment will be described, below.

As illustrated in FIG. 2, the terminal 200 includes a receiver 210 configured to receive the multiplexed data obtained by multiplexing the plurality of types of data transmitted in a scheme different in the error tolerance. As described above, the multiplexed data is transmitted from the base station 100 by multicast/broadcast. The plurality of types of transmission data includes the basic transmission data and the additional transmission data.

In the first embodiment, the basic transmission data and the additional transmission data are multiplexed in the power region. The transmission power applied to the additional transmission data is lower than the transmission power applied to the basic transmission data.

The terminal 200 further includes a separation unit 220 and a decoding unit 230. The terminal 200 may further include an application processor (reproduction unit) configured to utilize (reproduce) the transmission data.

(2.1) Reception Apparatus Under Good Propagation Environment

The reception apparatus (terminal 200-1) under a good propagation environment will be described, below.

In the terminal 200-1, the separation unit 220 separates the multiplexed data received by the receiver 220 into the basic transmission data and the additional transmission data. The decoding unit 230 decodes (performs error correction decoding and the like on) the basic transmission data and the additional transmission data separated by the separation unit 220.

Here, a signal process in the separation unit 220 will be described.

First, the separation unit 220 considers the additional transmission data as a noise and performs a first process of extracting the basic transmission data from the multiplexed data. The additional transmission data is transmitted at a low transmission power, and thus, it is easy to extract the basic transmission data transmitted at a high transmission power.

Next, the separation unit 220 uses a replica of the basic transmission data to cancel the basic transmission data included in the multiplexed data to perform a second process of extracting the additional transmission data included in the multiplexed data. In other words, the basic transmission data is considered as the noise (interference) and an interference cancellation process is performed.

Thus, the separation unit 220 separates, by the first process and the second process, into the basic transmission data and the additional transmission data.

Thereafter, the basic transmission data and the additional transmission data decoded by the decoding unit 230 are utilized by an application processor (reproduction unit).

(2.2) Reception Apparatus Under Poor Propagation Environment

The reception apparatus (terminal 200-2) under a poor propagation environment will be described, below.

In the terminal 200-2, due to a pathloss with the base station 100, power of the multiplexed data (basic transmission data and additional transmission data) received by the receiver 220 is attenuated. The additional transmission data is transmitted at a low transmission power, and thus, a power component of the additional transmission data in the multiplexed data is extremely low or equivalent to zero.

As a result, the separation unit 220 extracts only the basic transmission data transmitted at a high transmission power. The separation unit 220 may consider the additional transmission data as the noise to perform the first process of extracting the basic transmission data from the multiplexed data.

Thereafter, the basic transmission data decoded by the decoding unit 230 is utilized by the application processor (reproduction unit).

(Specific Examples of Basic Transmission Data and Additional Transmission Data)

The specific examples of the basic transmission data and the additional transmission data will be described, below.

If an application of the multicast/broadcast transmission is a video transmission 1, the basic transmission data is "voice data", and the additional transmission data is "video data". The terminal 200-1 is capable of utilizing a high quality service by combining the "voice data" and the "video data", and the terminal 200-2 is capable of utilizing the "voice data" only.

If the application of the multicast/broadcast transmission is a video transmission 2, the basic transmission data is "voice data+video data (low frequency component)" and the additional transmission data is "video data (high frequency component)". As an example of JPEG or Motion JPEG, a DC component in a DCT may be allocated as a low frequency component, and the remaining component (AC component) in the DCT may be allocated as a high frequency component. The terminal 200-1 is capable of utilizing a high quality (that is, high image quality) service by combining the "voice data+video data (low frequency component)" and the "video data (high frequency component)", and the terminal 200-2 is capable of utilizing the "voice data+video data (low frequency component)" only.

If the application of the multicast/broadcast transmission is the video transmission 3, the basic transmission data is "voice data+video data (ultra-component)" and the additional transmission data is the "video data (inter-component)". The intra-component is, for example, an "I picture" in an MPEG 2. The inter component is, for example, a "P, B picture" in the MPEG 2. The terminal 200-1 is capable of utilizing the high quality (that is, high image quality) service, by combining the "voice data+video data (intra-component)" and the "video data (inter-component)", and the terminal 200-2 is capable of utilizing the "voice data+video data (intra-component)" only.

If the application of the multicast/broadcast transmission is a video transmission 4, the basic transmission data is "voice data+video data (for right eye)" and the additional transmission data is "video data (for left eye)". The terminal 200-1 is capable of utilizing a high quality (that is, 3D image) service by combining the "voice data+video data (for right eye)" and the "video data (for left eye)", and the terminal 200-2 is capable of utilizing the "voice data+video data (for right eye)" only.

If the application of the multicast/broadcast transmission is a video transmission 5, the basic transmission data is "video data (brightness component)", and the additional transmission data is "video data (color difference component)". For example, the brightness component is Y, and the color difference component is Cb, Cr, or U, V.

If the application of the multicast/broadcast transmission is a video transmission 6, the basic transmission data is "video data (coarse quantization bit)", and the additional transmission data is "video data (fine quantization bit)".

If the If the application of the multicast/broadcast transmission is a music transmission 1, the basic transmission data is "voice data (mono)", and the additional transmission data is "voice data (stereo)". The terminal 200-1 is capable of utilizing a high quality (that is, high sound quality) service by combining the "voice data (mono)" and the "voice data (stereo)", and the terminal 200-2 is capable of utilizing the "voice data (mono)" only.

If the application of the multicast/broadcast transmission is a music transmission 2, the basic transmission data is "music data (stereo consisting of "L" and "R")", and the additional transmission data is "music data (channel other than "L" and "R")". In a case of 5.1ch, the music data is constituted by six speakers (channels) of: L, R, C, Ls, Rs, and LFE (0.1ch). In a case of 7.1ch, the music data is constituted by eight speakers (channels) of: L, R, C, Ls, Rs, Lb, Rb, and LFE. In the basic transmission data, L and R are transmitted, and in the additional transmission data, channels other than L and R (in a case of 5.1ch, C, Ls, Rs, and LFE, in a case of 7.1ch, C, Ls, Rs, Lb, Rb, and LFE) are transmitted. The terminal 200-1 is capable of utilizing the high quality (that is, high sound quality) service by combining the "music data (stereo consisting of "L" and "R") and the "music data (channels other than "L" and "R")", and the terminal 200-2 is capable of utilizing the "voice data (stereo)" only.

If the application of the multicast/broadcast transmission is the data transmission, the basic transmission data is "character information", and the additional transmission data is "image information". The terminal 200-1 is capable of utilizing the high quality service by combining the "character information" and the "image information", and the terminal 200-2 is capable of utilizing the "character information" only.

Second Embodiment

Figure 3:
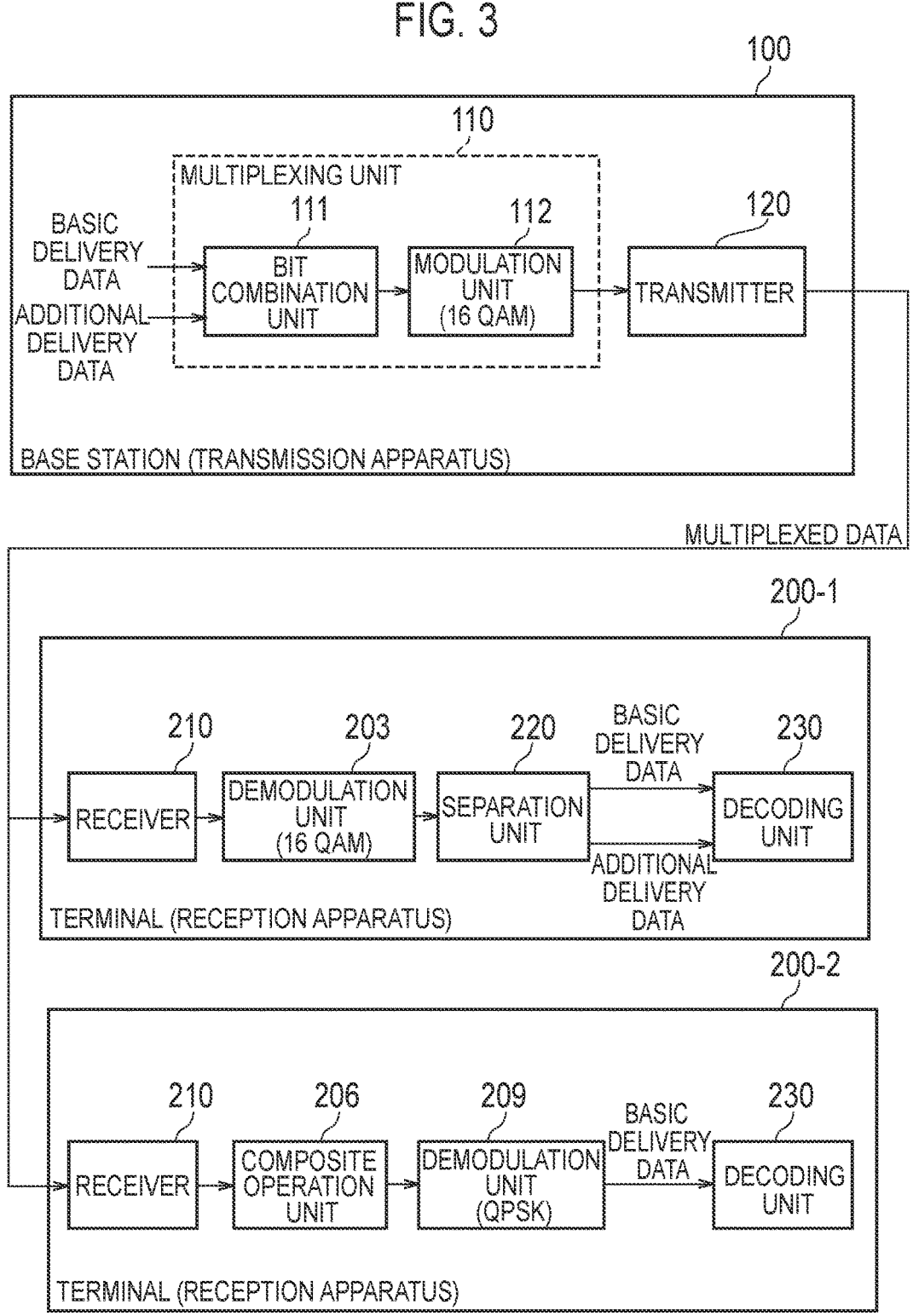
FIG. 3 is a block diagram of a transmission apparatus (base station) and a reception apparatus (terminal) according to a second embodiment.

A second embodiment will be described with a particular focus on a difference from the first embodiment. FIG. 3 is a block diagram of the transmission apparatus (base station 100) and the reception apparatus (terminal 200) according to the second embodiment.

(1) Transmission Apparatus

The transmission apparatus (base station 100) according to the first embodiment will be described, below.

As illustrated in FIG. 3, the base station 100 includes the multiplexing unit 110 configured to multiplex the plurality of types of data transmitted in a scheme different in the error tolerance, and the transmitter 120 configured to transmit, by multicast/broadcast, the multiplexed data obtained by the multiplexing unit 110.

The plurality of types of transmission data include the basic transmission data transmitted in a scheme having the first error tolerance, and the additional transmission data transmitted in a scheme having the second error tolerance lower than the first error tolerance. The first error tolerance is an error tolerance adapted to a poor propagation environment. The second error tolerance is an error tolerance adapted to a good propagation environment. The additional transmission data is utilized in combination with the basic transmission data in the terminal 200. It is noted that the basic transmission data and the additional transmission data may be coded.

In the second embodiment, the multiplexing unit 110 includes a bit combination unit 111 configured to generate a bit string including the basic transmission data and the additional transmission data, and a modulation unit 112 configured to perform mapping to a symbol for each bit string generated by the bit combination unit 111 by using a predetermined modulation scheme.

The bit combination unit 111 repeatedly includes identical basic transmission data into the bit string so that the bit string including the identical basic transmission data is mapped to the plurality of consecutive symbols.

The predetermined modulation scheme is the same as a first modulation scheme used by the terminal 200-1 under a good propagation environment, and different from the second modulation scheme used by the terminal 200-2 under a poor propagation environment. The second modulation scheme is a modulation scheme having a fewer number of bits transmitted per each symbol compared to the predetermined modulation scheme. A case where the predetermined modulation scheme is 16 QAM and the second modulation scheme is QPSK will be exemplified, below.

The bit combination unit 111 fixes a bit position of the basic transmission data in the bit string at a specific bit position so that the plurality of consecutive symbols are arranged at signal points adjacent on an IQ plane.

Here, a process in the bit combination unit 111 will be described in detail.

An information bit of the basic transmission data is indicated by "a1, a2, a3, . . . ", and an information bit of the additional transmission data is indicated by "b1, b2, b3, . . . ". The bit combination unit 111 combines the information bits of the basic transmission data and the information bits of the additional transmission data as follows.

$$\{(a1,b1,a2,b2),(a1,b3,a2,b4),(a1,b5,a2,b6),(a1,b7,a2,b8)\},\{(a3,b9,a4,b10)),(a3,b11,a4,b12),(a3,b13,a4,b14),(a3,b15,a4,b16)\},\ldots$$

When the above is in a generalized expression, it is described as follows.

$$\ldots,\{(a_{2i+1},b_{8i+1},a_{2i+2},b_{8i+2}),(a_{2i+1},b_{8i+3},a_{2i+2},b_{8i+4}),(a_{2i+1},b_{8i+5},a_{2i+2},b_{8i+6}),(a_{2i+1},b_{8i+7},a_{2i+2},b_{8i+8}),\}\ldots,i=0,1,2,\ldots \quad (1)$$

Here, four information bits enclosed in ( ) constitute one "bit string". In each bit string, first and third bits are the information bit of the basic transmission data whereas second and fourth bits are information bit of the additional transmission data. The four bit strings enclosed in { } constitute the plurality of symbol signal points adjacent on a set of the IQ plane (these symbol signal points are subject to the composite operation of the reception apparatus under a poor propagation environment). Further, a part enclosed in { } corresponds to one i value.

Thus, the bit combination unit 111 generates the bit string including the basic transmission data and the additional transmission data. The modulation unit 112 uses the 16 QAM to perform mapping to a symbol for each bit string generated by the bit combination unit 111. As indicated in formula (1), the first and third bits in four consecutive bit strings are the same.

Figure 4:
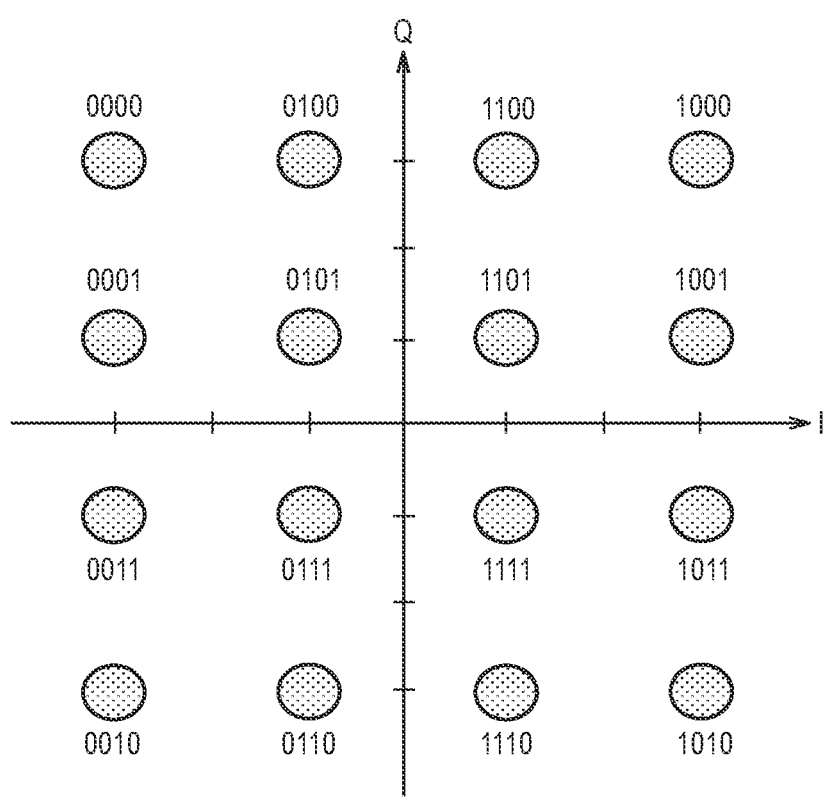
FIG. 4 is a diagram illustrating a 16 QAM constellation.

FIG. 4 is a diagram illustrating the 16 QAM constellation.

As illustrated in FIG. 4, 16 signal points are arranged on the 16 QAM constellation, and each signal point corresponds to one symbol corresponding to each of the 4 bits combination. For example, if 4 bits of "1101" are subject to 16 QAM modulation, among the four signal points in a first quadrant on the IQ plane (both I component and Q component are in positive quadrants), a symbol corresponding to a signal point closest to the origin is generated.

In the 16 QAM constellation, the 4 bits corresponding to the four signal points in the first quadrant are four patterns of "1101", "1001", "1100", and "1000". Of these four patterns, a first is always "1" and a third bit is always "0". Further, even in the quadrants other than the first quadrant, the first and third bits are the same value (same bit value).

As a result, as indicated in formula (1), these four bit strings are mapped to the signal points in the identical quadrant in the 16 QAM constellation by setting the first and third bits in the four consecutive bit strings to be the same. In other words, the four consecutive symbols are arranged at the signal points adjacent on the IQ plane.

Thus, the bit combination unit 111 fixes the bit position of the basic transmission data in the bit string to the first and third bits so that the four consecutive symbols are arranged at the signal points adjacent on the IQ plane.

(2) Reception Apparatus

The reception apparatus (terminal 200) according to the second embodiment will be described, below.

As illustrated in FIG. 3, the terminal 200 (200-1 and 200-2) includes the receiver 210 configured to receive the multiplexed data obtained by multiplexing the plurality of types of data transmitted in a scheme different in the error tolerance. As described above, the multiplexed data is transmitted from the base station 100 by multicast/broadcast. The plurality of types of transmission data includes the basic transmission data and the additional transmission data.

In the second embodiment, the multiplexed data includes a symbol obtained by the predetermined modulation scheme (16 QAM). The symbol is mapped with the bit string including the basic transmission data and the additional transmission data. Further, the plurality of consecutive symbols (four consecutive symbols) are mapped with the bit string including the identical basic transmission data.

(2.1) Reception Apparatus Under Good Propagation Environment

The reception apparatus (terminal 200-1) under a good propagation environment will be described, below.

The terminal 200-1 includes, in addition to the receiver 210, a demodulation unit 203, the separation unit 220, and the decoding unit 230.

The demodulation unit 203 uses the predetermined modulation scheme (16 QAM) to demodulate a bit string for each symbol. That is, the demodulation unit 203 demodulates the symbol transmitted by the 16 QAM as the 16 QAM.

The separation unit 220 separates the bit string into the basic transmission data and the additional transmission data. Here, the separation unit 220 performs a process opposite to that of the bit combination unit 111 and separates bits into the information bit of the basic transmission data and the information bit of the additional transmission data. Specifically, the first and third bits are separated as the information bit of the basic transmission data, and the second and fourth bits are separated as the information bit of the additional transmission data.

The decoding unit 230 decodes the basic transmission data and the additional transmission data. Thereafter, the basic transmission data and the additional transmission data are utilized in combination by the application processor (reproduction unit).

(2.2) Reception Apparatus Under Poor Propagation Environment

The reception apparatus (terminal 200-2) under a poor propagation environment will be described, below.

The terminal 200-2 includes, in addition to the receiver 210, a composite operation unit 206, a demodulation unit 209, and the decoding unit 230.

The composite operation unit 206 performs the composite operation on the plurality of consecutive symbols (four consecutive symbols) to generate the composite symbol. As described above, the four consecutive symbols are arranged at the signal points adjacent on the IQ plane (specifically, identical quadrant).

As a first example of the composite operation, the composite operation unit 206 performs a simple average calculation (equal gain combining). If the four consecutive received symbols are indicated as r1, r2, r3, and r4, then the composite operation=(r1+r2+r3+r4)/4.

As a second example of the composite operation, the composite operation unit 206 performs a weighted composite operation (Maximal Ratio Combining), with the S/N (SINR) ratio of each symbol as a weight. If the SINR ratio corresponding to the four received symbols is indicated as a SINR, then the composite operation=root (SINR1)*r1+root (SINR2)*r2+root (SINR3)*r3+root (SINR)*r4. It is noted that the four consecutive received symbols are transmitted on the same propagation path and in the same time-frequency resource, and the reception interval is extremely short. Thus, the difference of SINR according to the propagation environment may be small. As a result, the first example is preferred from the ease of calculation.

Figure 5:
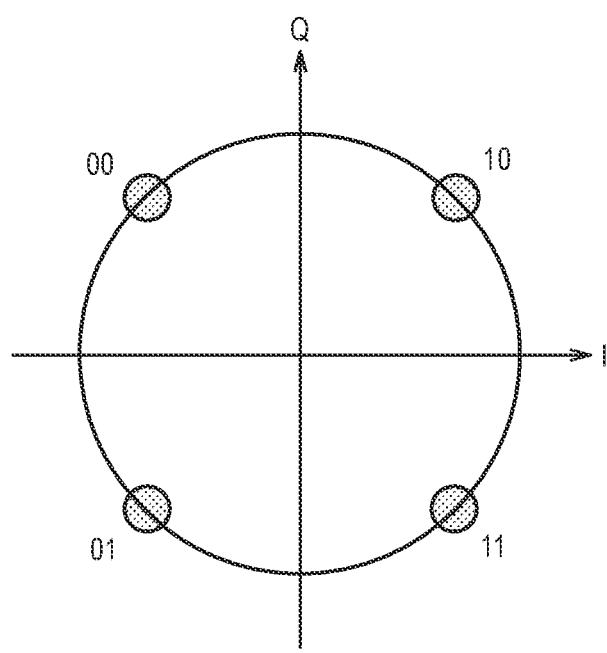
FIG. 5 is a diagram illustrating an equivalent QPSK constellation when a demodulation unit performs a QPSK demodulation according to the second embodiment.

The demodulation unit 209 demodulates the composite symbol in accordance with the second modulation scheme (QPSK) different from the predetermined modulation scheme. However, the demodulation unit 209 uses a constellation different from a constellation of a general QPSK. FIG. 5 is a diagram illustrating an equivalent QPSK constellation when the demodulation unit 209 performs a QPSK demodulation. As illustrated in FIG. 5, the demodulation unit 209 demodulates the symbol of the first quadrant as "10", the symbol of the second quadrant as "00", and the symbol of the third quadrant as "01" and the symbol of the fourth quadrant as "11". These 2 bits are the information bits constituting the basic transmission data.

Thus, the composite operation unit 206 and the demodulation unit 209 perform the composite operation on the four sequentially received modulated symbols and perform QPSK demodulation as one symbol. The basic transmission data obtained by the demodulation unit 209 is decoded by the decoding unit 230. Thereafter, the basic transmission data decoded by the decoding unit 230 is utilized by the application processor (reproduction unit).

It is noted that although a frame synchronization on the transmission side and the reception side is required to perform the composite operation on the four sequentially received correct modulated symbols, a general digital communication system obtains such a frame synchronization before performing communication. The frame synchronization method is related to a specific communication system applying the present application, and thus it will not be discussed here.

First Modification of Second Embodiment

In the above-described second embodiment, although an example where the QPSK and the 16 QAM are combined is described, the multiplex transmission and reception can be also performed in the same concept with the 16 QAM and the 64 QAM.

In the present modification, the bit combination unit 111 of the base station 100 combines the first, second, fourth and fifth bits as the information bit of the basic transmission data, the third and sixth bits as the information bit of the additional transmission data, to generate a bit string. That is, the bit combination unit 111 combines the information bit of the basic transmission data and the information bit of the additional transmission data as follows.

{(a1,a2,b1,a3,a4,b2),(a1,a2,b3,a3,a4,b4),(a1,a2,b5, a3,a4,b6),(a1,a2,b7,a3,a4,b8)},{(a5,a6,b9,a7,a8, b10),(a5,a6,b11,a7,a8,b12),(a5,a6,b13,a7,a8, b14),(a5,a6,b15,a7,a8,b16)}, . . .

When the above is in a generalized expression, it is described as follows.

$$\ldots,\{(a_{4i+1},a_{4i+2},b_{8i+1},a_{4i+3},a_{4i+4},b_{8i+2}),(a_{4i+1},a_{4i+2}, b_{8i+3},a_{4i+3},a_{4i+4},b_{8i+4}),(a_{4i+1},a_{4i+2}, b_{8i+5},a_{4i+3},a_{4i+4},b_{8i+6}),(a_{4i+1},a_{4i+2},b_{8i+7}, a_{4i+3},a_{4i+4},b_{8i+8})\},\ldots,i=0,1,2,\ldots \quad (2)$$

Here, six information bits enclosed in 0 constitute one "bit string". In the four consecutive bit strings, the first, second, fourth, and fifth bits are the same.

Figure 6:
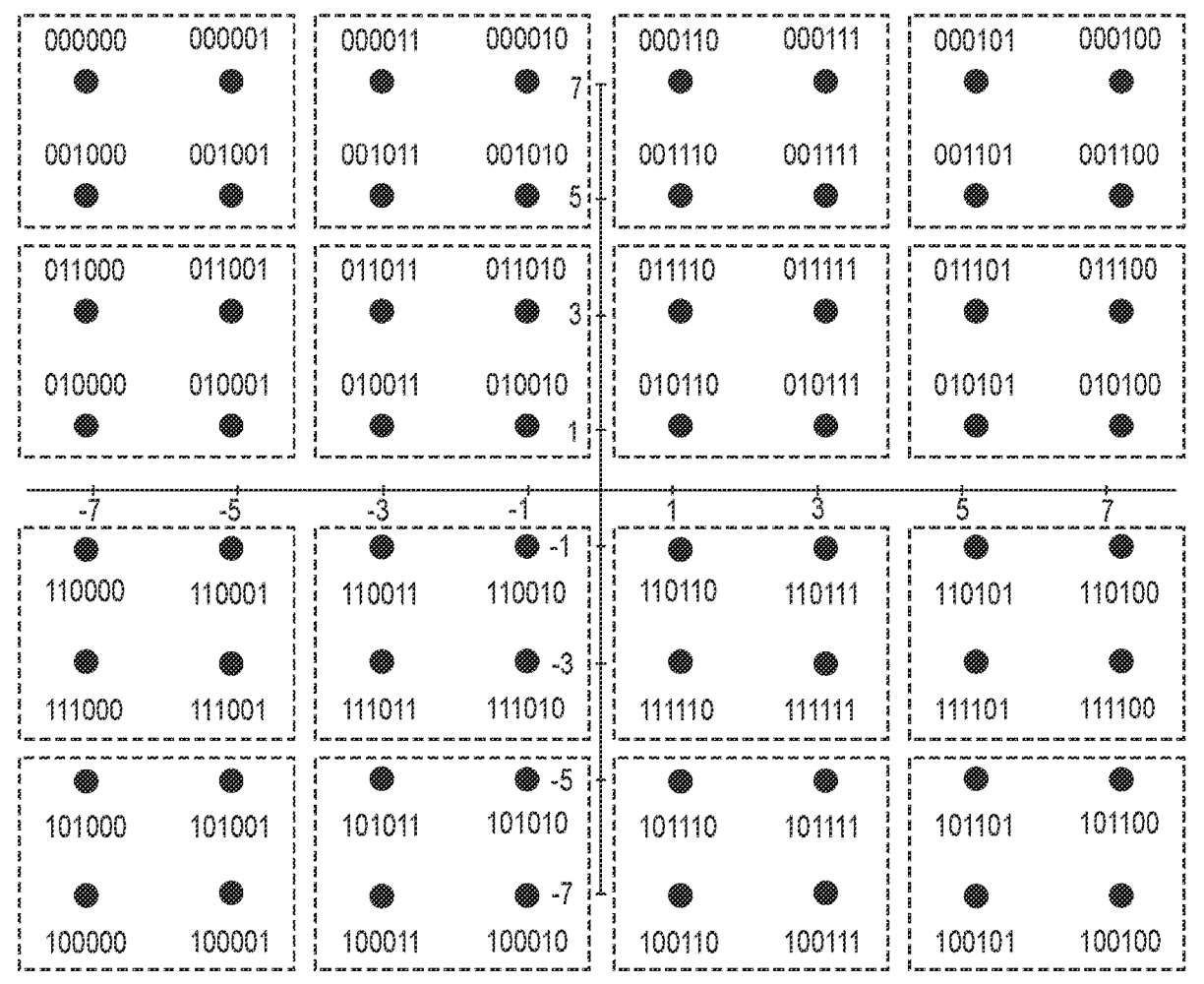

The modulation unit 112 performs mapping of the bit string to the symbol by the 64 QAM. FIG. 6 is a diagram illustrating the 64 QAM constellation. As illustrated in FIG. 6, if each quadrant is divided into four regions (regions indicated by dashed line), the first, second, fourth, and fifth bits are the same in each region. As a result, in the four consecutive bit strings, when the same basic transmission data is arranged on the first, second, fourth, and fifth bits, the four consecutive symbols are mapped in the identical region.

In the terminal 200-1, the demodulation unit 203 uses the 64 QAM to demodulate the bit strings for each symbol. That is, the demodulation unit 203 demodulates the symbol transmitted by the 64 QAM as the 64 QAM. The separation unit 220 separates the bit string into the basic transmission data and the additional transmission data. Specifically, the separation unit 220 performs a process opposite to that of the bit combination unit 111, and separates bits into the information bit of the basic transmission data and the information bit of the additional transmission data.

On the other hand, in the terminal 200-2, the composite operation unit 206 performs the composite operation on the plurality of consecutive symbols (four consecutive symbols) to generate the composite symbol. The method of the composite operation is the same as that of the second embodiment. The demodulation unit 209 demodulates the composite symbol in accordance with the second modulation scheme (16 QAM) different from the predetermined modulation scheme (64 QAM).

Figure 7:
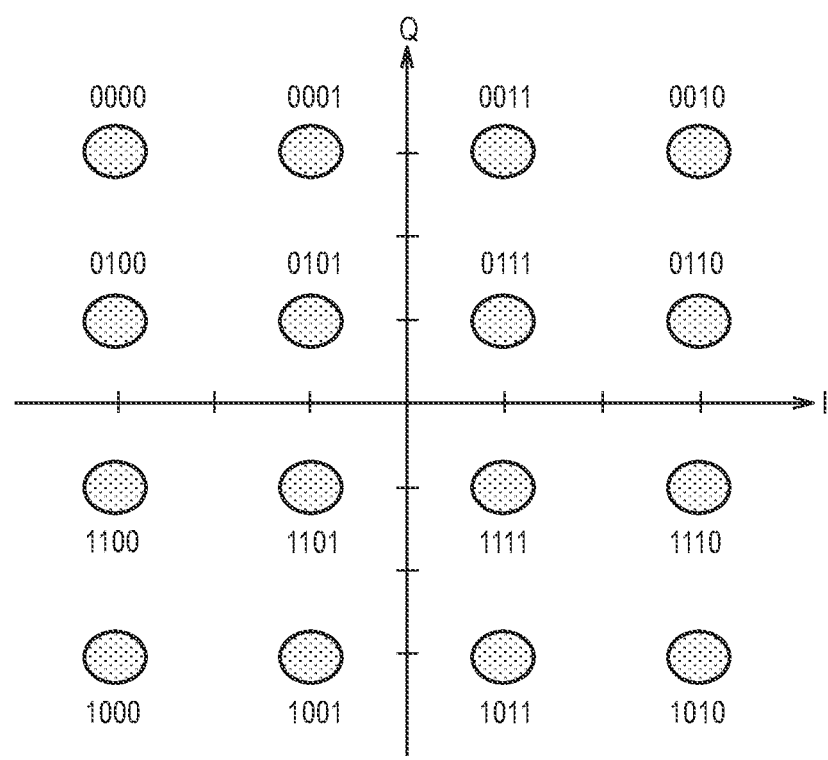
FIG. 7 is a diagram illustrating an equivalent constellation when the demodulation unit performs a 16 QAM demodulation according to a first modification of the second embodiment.

However, the demodulation unit 203 uses a constellation different from a general 16 QAM constellation. FIG. 7 is a diagram illustrating an equivalent constellation when the demodulation unit 209 performs the 16 QAM demodulation. As illustrated in FIG. 7, the present constellation is obtained by modifying the general constellation illustrated in FIG. 4 as follows.

First Quadrant:
The symbol at a 1100 position (surrounding) of FIG. 4 is demodulated as 0011 (hereinafter "of FIG. 4" and "surrounding" are omitted).
The symbol at a 1000 position is demodulated as 0010.
The symbol at a 1101 position is demodulated as 0111.
The symbol at a 1001 position is demodulated as 0110.
Second Quadrant:
The symbol at a 0000 position is demodulated as 0000.
The symbol at a 0100 position is demodulated as 0001.
The symbol at a 0001 position is demodulated as 0100.
The symbol at a 0101 position is demodulated as 0101.
Third Quadrant:
The symbol at a 0011 position is demodulated as 1100.
The symbol at a 0111 position is demodulated as 1101.
The symbol at a 0010 position is demodulated as 1000.
The symbol at a 0110 position is demodulated as 1001.
Fourth Quadrant:
The symbol at a 1111 position is demodulated as 1111.
The symbol at a 1011 position is demodulated as 1110.
The symbol at a 1110 position is demodulated as 1011.
The symbol at a 1010 position is demodulated as 1010.

Thus, the composite operation unit 206 and the demodulation unit 209 perform the composite operation on the four sequentially received modulated symbols and then perform the 16 QAM demodulation as one symbol. The basic transmission data obtained by the demodulation unit 209 is decoded by the decoding unit 230.

Second Modification of Second Embodiment

In the above-described second embodiment, the same basic transmission data was arranged at the specific bit positions of the four consecutive bit strings, so that the four consecutive symbols are mapped to the adjacent signal points. That is, the information bit of the identical basic transmission data was redundantly transmitted four times (four overlaps). However, instead of the four overlaps, two overlaps or three overlaps may be possible.

A combination of QPSK-16 QAM of two overlaps will be described as an example. The base station 100 transmits, by the 16 QAM, by combining the bits of the basic transmission data and the additional transmission data, as described below.

{(a1,b1,a2,b2),(a1,b3,a2,b4)},{(a3,b5,a4,b6),(a3,b7, a4,b8)}, . . .

General Expression:

$$\ldots\{(a_{2i+1},b_{4i+1},a_{2i+2},b_{4i+2}),(a_{2i+1},b_{4i+3},a_{2i+2}, b_{4i+4})\},\ldots,i=0,1,2,\ldots$$

That is, a first and third bits of the two bit strings enclosed in { } are the same (two overlaps). In this case, a UE 100-1 demodulates as the 16 QAM, and a UE 100-2 performs the composite operation on the two sequentially received symbols and performs the QPSK demodulation as one symbol.

It is noted that although an example of the three overlaps is not described, the exact same concept applies (that is, the same bit is arranged in the first and third bits of three consecutive bit strings).

Further, the two overlaps and the three overlaps are also possible in the case of the above-described first modification (combination of 16 QAM-64 QAM).

Third Modification of Second Embodiment

In the above-described second embodiment, a case where the basic transmission data and the additional transmission data were transmitted to the UE 100-1 under a good propagation environment and the UE 100-2 under a poor propagation environment was exemplified.

In the present modification, a case where the basic transmission data, additional transmission data 1, and additional transmission data 2 are transmitted to the UE 100-1 under a good propagation environment, the UE 100-2 under a poor propagation environment, and a UE 100-3 under a moderate propagation environment will be described.

The information bit of the basic transmission data is indicated as "a1, a2, a3, . . . ", the information bit of the additional transmission data 1 is indicated as "b1, b2, b3, . . . ", and the information bit of the additional transmission data 2 is indicated as "c1, c2, c3, . . . ", below.

The base station 100 combines the information bits of the basic transmission data and the additional transmission data 1 in the same bit combination method as that in the above-described second embodiment.

$$\{"A"(a_{2i+1},b_{8i+1},a_{2i+2},b_{8i+2}),"B"(a_{2i+1},b_{8i+3},a_{2i+2},\\b_{8i+4}),"C"(a_{2i+1},b_{8i+5},a_{2i+2},b_{8i+6}),"D"(a_{2i+1},\\b_{8i+7},a_{2i+2},b_{8i+8})\}$$

This process configures and ensures the four 16 QAM symbol points of the same quadrant.

Further, each of the four above-described bit strings (from "A" to "D") is combined with the additional transmission data 2 in the same bit combination method as that in the above-described first modification. That is, each of "A" to "D" is regarded as the basic transmission data of the first modification, and combined with the additional transmission data 2 in the same method as that in the first modification.

Firstly, the bit string "A" ($a_{2i+1}$, $b_{8i+1}$, $a_{2i+2}$, $b_{8i+2}$) is regarded as the basic transmission data of the first modification and combining with the additional transmission data 2 (combination method is the same as first modification) results in the following.

$$\{(a_{2i+1},b_{8i+1},C_{32i+1},a_{2i+2},b_{8i+2},C_{32i+2}),(a_{2i+1},b_{8i+1},\\C_{32i+3},a_{2i+2},b_{8i+2},C_{32i+4}),(a_{2i+1},b_{8i+1},C_{32i+5},a_{2i+2},\\b_{8i+2},C_{32i+6}),(a_{2i+1},b_{8i+1},C_{32i+7},a_{2i+2},b_{8i+2},\\C_{32i+8})\}, \quad (3)$$

As a result, four symbol points are formed in the surrounding of "A" ($a_{2i+1}$, $b_{8i+1}$, $a_{2i+2}$, $b_{8i+2}$).

Secondly, combining the bit string "B" ($a_{2i+1}$, $b_{8i+3}$, $a_{2i+2}$, $b_{8i+4}$) with the additional transmission data 2 results in the following.

$$\{(a_{2i+1},b_{8i+3},C_{32i+9},a_{2i+2},b_{8i+4},C_{8i+10}),(a_{2i+1},b_{8i+3},\\C_{32i+11},a_{2i+2},b_{8i+4},C_{32i+12}),(a_{2i+1},b_{8i+3},C_{32i+13},\\a_{2i+2},b_{8i+4},C_{32i+14}),(a_{2i+1},b_{8i+3},C_{32i+15},a_{2i+2},\\b_{8i+4},C_{32i+16})\}, \quad (4)$$

As a result, four symbol points are formed in the surrounding of "B" ($a_{2i+1}$, $b_{8i+3}$, $a_{2i+2}$, $b_{8i+4}$).

Thirdly, combining the bit string "C" ($a_{2i+1}$, $b_{8i+5}$, $a_{2i+2}$, $b_{8i+6}$) with the additional transmission data 2 results in the following.

$$\{(a_{2i+1},b_{8i+5},C_{32i+17},a_{2i+2},b_{8i+6},C_{32i+18}),(a_{2i+1},b_{8i+5},\\C_{32i+19},a_{2i+2},b_{8i+6},C_{32i+20}),(a_{2i+1},b_{8i+5},C_{32i+21},\\a_{2i+2},b_{8i+6},C_{32i+22}),(a_{2i+1},b_{8i+5},C_{32i+23},a_{2i+2},\\b_{8i+6},C_{32i+24})\}, \quad (5)$$

As a result, four symbol points are formed in the surrounding of "C" ($a_{2i+1}$, $b_{8i+5}$, $a_{2i+2}$, $b_{8i+6}$).

Fourthly, combining the bit string "D" ($a_{2i+1}$, $b_{8i+7}$, $a_{2i+2}$, $b_{8i+8}$) with the additional transmission data 2 results in the following.

$$\{(a_{2i+1},b_{8i+7},C_{32i+25},a_{2i+2},b_{8i+8},C_{32i+26}),(a_{2i+1},b_{8i+7},\\C_{32i+27},a_{2i+2},b_{8i+8},C_{32i+28}),(a_{2i+1},b_{8i+7},C_{32i+29},\\a_{2i+2},b_{8i+8},C_{32i+30}),(a_{2i+1},b_{8i+7},C_{32i+31},a_{2i+2},\\b_{8i+8},C_{32i+32})\}, \quad (6)$$

As a result, four symbol points are formed in the surrounding of "D" ($a_{2i+1}$, $b_{8i+7}$, $a_{2i+2}$, $b_{8i+8}$).

It can be understood from the first and the fourth bits of the above (3), (4), (5), and (6) are all the same that all of (3), (4), (5), and (6) is distributed in the same quadrant. Further, as the first, second, fourth, and fifth bits are the same for each of the above-described (3), (4), (5), and (6), it can be understood that the corresponding symbol of each of (3), (4), (5), and (6) is mapped to the identical regions of FIG. 6.

Furthermore, the base station 100 transmits, by modulating by the 64 QAM, the above-described (3), (4), (5), and (6).

The UE 100-1 (under a good propagation environment) performs demodulation as the 64 QAM. In the demodulated information, three sets of information bits are included. The bit separation process is a reverse operation of the bit combination.

The UE 100-3 (under a moderate propagation environment) performs the composite operation on the four consecutive received symbols and demodulates as the 16 QAM, in the same method as that in the above-described first modification. The bit separation process is a reverse operation of the bit combination.

Figure 8:
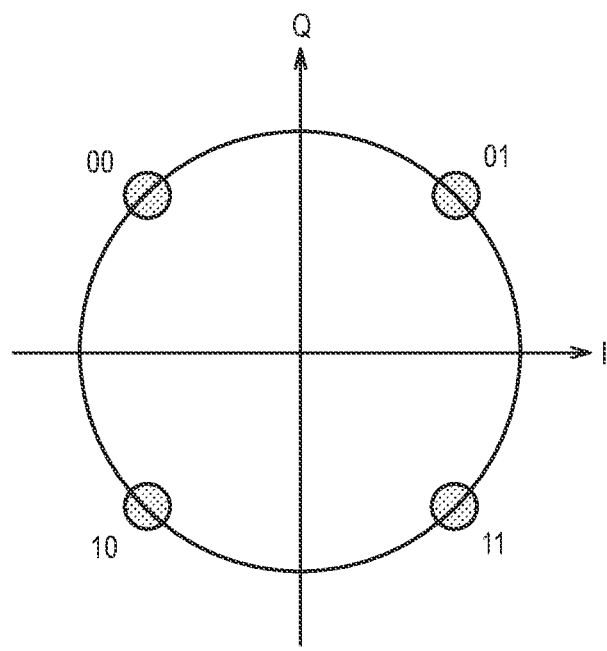
FIG. 8 is a diagram illustrating an equivalent QPSK constellation when the demodulation unit performs the QPSK demodulation according to a third modification of the second embodiment.

The UE 100-2 (under a poor propagation environment) performs the composite operation on the 16 consecutive received symbols and then demodulates as the QPSK. The equivalent constellation of the QPSK used in this case is illustrated in FIG. 8.

Third Embodiment

Figure 9:
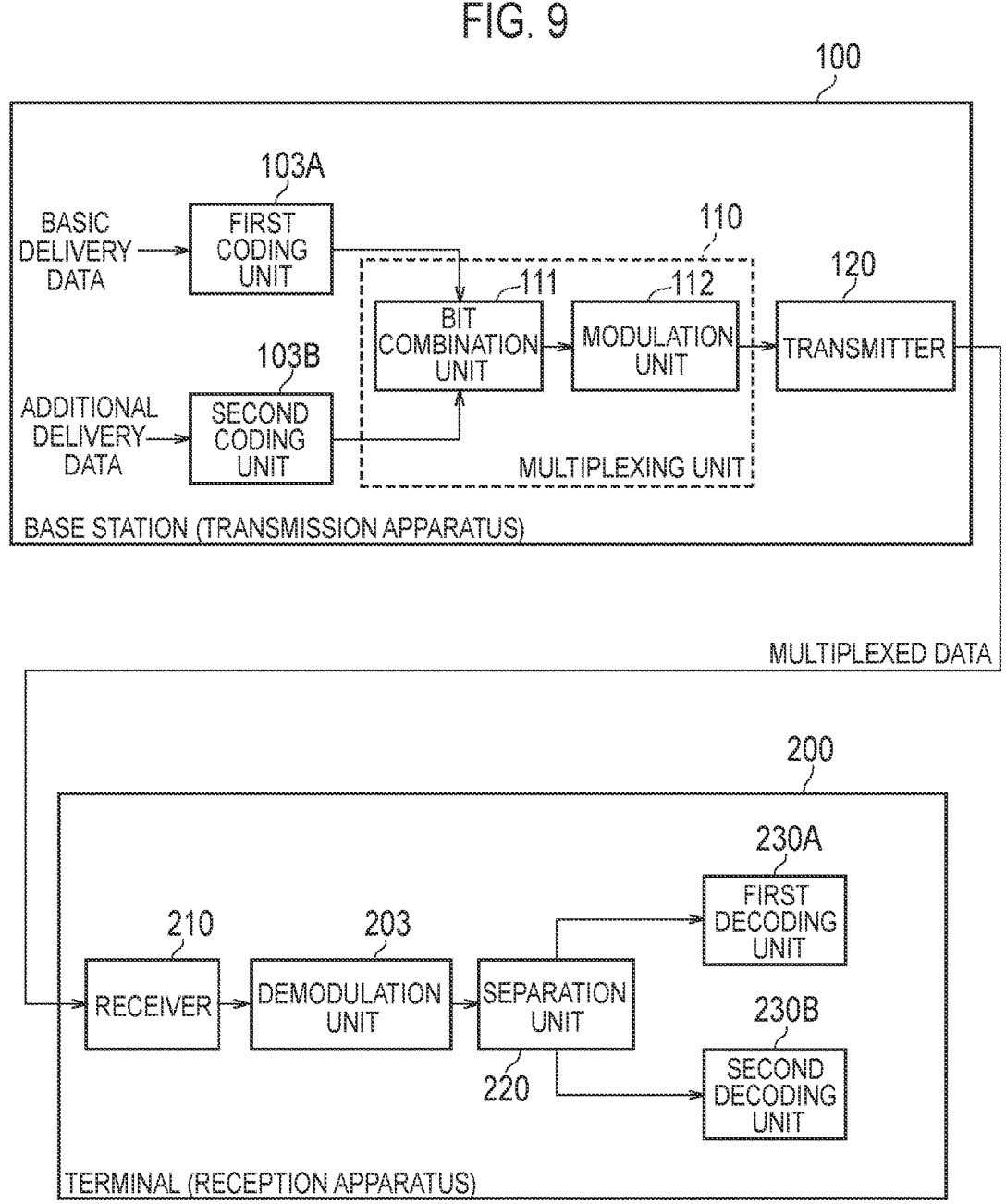
FIG. 9 is a block diagram of a transmission apparatus (base station) and a reception apparatus (terminal) according to a third embodiment.

A third embodiment will be described with a particular focus on a difference from the first embodiment. FIG. 9 is a block diagram of the transmission apparatus (base station 100) and the reception apparatus (terminal 200) according to the third embodiment.

(1) Transmission Apparatus

The transmission apparatus (base station 100) according to the third embodiment will be described, below.

As illustrated in FIG. 9, the base station 100 includes the multiplexing unit 110 configured to multiplex the plurality of types of data transmitted in a scheme different in the error tolerance, and the transmitter 120 configured to transmit, by multicast/broadcast, the multiplexed data obtained by the multiplexing unit 110.

The plurality of types of transmission data include basic transmission data transmitted in a scheme having a first error tolerance, and additional transmission data transmitted in a scheme having a second error tolerance lower than the first error tolerance. The first error tolerance is an error tolerance adapted to a poor propagation environment. The second error tolerance is an error tolerance adapted to a good propagation environment. The additional transmission data is utilized in combination with the basic transmission data in the terminal 200.

In the third embodiment, the base station 100 includes a first coding unit 103A configured to code the basic transmission data to generate the coded basic transmission data, and a second coding unit 103B configured to code the additional transmission data to generate the coded additional transmission data. The coding scheme lower in the error tolerance compared to the coding scheme applied to the basic transmission data is applied to the additional transmission data. For example, a coding rate R of the additional transmission data is higher than a coding rate R1 of the basic transmission data.

The multiplexing unit 110 includes a bit combination unit 111 configured to generate the bit string including the coded basic transmission data and the coded additional transmission data, and the modulation unit 112 configured to perform mapping of the bit string to the symbol by using the predetermined modulation scheme. For example, if the modulation is performed by the 16 QAM, the bit combination unit 111 arranges, of the bit string (four bits) corresponding to one symbol, the information bit of the basic transmission data on the first two bits, and the information bit of the additional transmission data on the two subsequent bits. Alternatively, an odd number may be prescribed as the basic transmission data, and an even number as the additional transmission data.

(2) Reception Apparatus

The reception apparatus (terminal 200) according to the third embodiment will be described, below.

As illustrated in FIG. 9, the terminal 200 (200-1 and 200-2) includes the receiver 210 configured to receive the multiplexed data obtained by multiplexing the plurality of types of data transmitted in a scheme different in the error tolerance. As described above, the multiplexed data is transmitted from the base station 100 by multicast/broadcast. The plurality of types of transmission data includes the basic transmission data and the additional transmission data.

In the third embodiment, the multiplexed data includes symbols obtained by the predetermined modulation scheme. The symbols are mapped with the bit string including the coded basic transmission data obtained by coding the basic transmission data and the coded additional transmission data obtained by coding the additional transmission data. The coding scheme lower in the error tolerance compared to the coding scheme applied to the basic transmission data is applied to the additional transmission data.

The terminal 200 further includes the demodulation unit 203, the separation unit 220, a first decoding unit 230A, and a second decoding unit 230B. The terminal 200 may further include an application processor (reproduction unit) configured to utilize (reproduce) the transmission data.

(2.1) Reception Apparatus Under Good Propagation Environment

The reception apparatus (terminal 200-1) under a good propagation environment will be described, below.

The demodulation unit 203 demodulates, by the predetermined modulation scheme (for example, 16 QAM), the bit string for each symbol.

The separation unit 220 separates the bit string into the coded basic transmission data and the coded additional transmission data. Specifically, the separation unit 220 performs a process opposite to that of the bit combination unit 111, and separates bits into the information bit of the basic transmission data and the information bit of the additional transmission data. For example, of the bit string corresponding to one symbol (four bits), the first two bits are separated as the information bit of the basic transmission data and the subsequent two bits as the information bit of the additional transmission data.

The first decoding unit 230A decodes the coded basic transmission data. The second decoding unit 230B decodes the coded additional transmission data. Under the good propagation environment, the second decoding unit 230B successfully decodes the coded additional transmission data.

Thereafter, the basic transmission data and the additional transmission data are utilized in combination by the application processor (reproduction unit). Thus, the terminal 200-1 is capable of utilizing both the basic transmission data and the additional transmission data.

(2.2) Reception Apparatus Under Poor Propagation Environment

The reception apparatus (terminal 200-2) under a poor propagation environment will be described, below.

In the terminal 200-2, the first decoding unit 230A decodes the coded basic transmission data. On the other hand, the second decoding unit 230B attempts to decode the coded additional transmission data, but fails to decode it. As a result, the terminal 200-2 is capable of utilizing only the basic transmission data.

Modification of Third Embodiment

In the third embodiment, although the error tolerance was differentiated by the coding scheme, the error tolerance may be further differentiated depending on the presence or absence of an interleave. Specifically, the interleave is performed on the basic transmission data and the error tolerance can be differentiated by not performing the interleave on the additional transmission data. Alternatively, the error tolerance may be differentiated by the presence and absence of the thinning of the bits (puncture).

Fourth Embodiment

Figure 10:
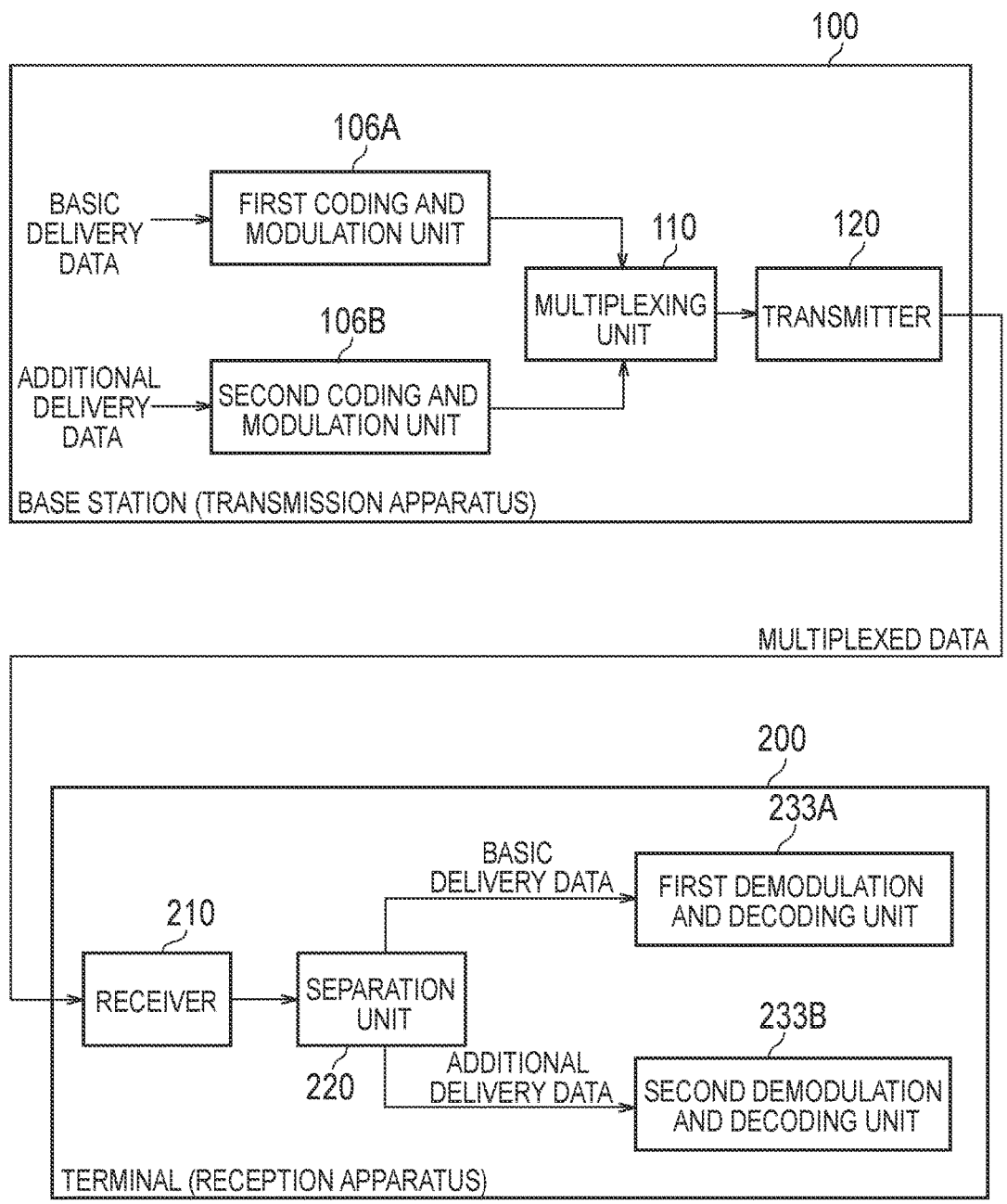
FIG. 10 is a block diagram of a transmission apparatus (base station) and a reception apparatus (terminal) according to a fourth embodiment.

A fourth embodiment will be described with a particular focus on a difference from the first embodiment. FIG. 10 is a block diagram of the transmission apparatus (base station 100) and the reception apparatus (terminal 200) according to the fourth embodiment.

(1) Transmission Apparatus

The transmission apparatus (base station 100) according to the fourth embodiment will be described, below.

As illustrated in FIG. 10, the base station 100 includes the multiplexing unit 110 configured to multiplex the plurality of types of data transmitted in a scheme different in the error tolerance, and the transmitter 120 configured to transmit, by multicast/broadcast, the multiplexed data obtained by the multiplexing unit 110.

The plurality of types of transmission data include the basic transmission data transmitted in a scheme having the first error tolerance, and the additional transmission data transmitted in a scheme having the second error tolerance lower than the first error tolerance. The first error tolerance is an error tolerance adapted to a poor propagation environment. The second error tolerance is an error tolerance adapted to a good propagation environment. The additional transmission data is utilized in combination with the basic transmission data in the terminal 200.

In the fourth embodiment, the multiplexing unit 110 multiplexes the basic transmission data and the additional transmission data in the frequency region. The additional transmission data is applied with a coding and/or a modulation lower in the error tolerance compared to the coding and/or the modulation scheme applied to the basic transmission data.

Specifically, the base station 100 includes a first coding and modulation unit 106A configured to code and modulate the basic transmission data, and a second coding and modulation unit 106 B configured to code and modulate the additional transmission data. The first coding and modulation unit 106A codes and modulates the basic transmission data in the predetermined coding scheme and the predetermined modulation scheme. The second coding and modulation unit 106B codes and modulates the additional transmission data in a coding scheme and/or modulation scheme lower in the error tolerance compared to the predetermined coding scheme and the predetermined modulation scheme.

Further, the multiplexing unit 110 multiplexes, in the frequency region, the basic transmission data output from the first coding and modulation unit 106A and the additional transmission data output from the second coding and modulation unit 106B. In other words, the different frequency resource is used for the transmission of the basic transmission data and the additional transmission data. That is, the basic transmission data and the additional transmission data are transmitted by a frequency division multiplexing (FDM).

(2) Reception Apparatus

The reception apparatus (terminal 200) according to the fourth embodiment will be described, below.

As illustrated in FIG. 10, the terminal 200 includes the receiver 210 configured to receive the multiplexed data obtained by multiplexing the plurality of types of data transmitted in a scheme different in the error tolerance. As described above, the multiplexed data is transmitted from the base station 100 by multicast/broadcast. The plurality of types of transmission data includes the basic transmission data and the additional transmission data.

The terminal 200 includes the separation unit 220 configured to separate the multiplexed data into the basic transmission data and the additional transmission data. A different frequency resource is used for transmitting the basic transmission data and the additional transmission data, and thus, the separation unit 220 can easily separate into the basic transmission data and the additional transmission data.

The terminal 200 includes a first demodulation and decoding unit 233A configured to demodulate and decode the basic transmission data, and a second demodulation and decoding unit 233B configured to demodulate and decode the additional transmission data. The first demodulation and decoding unit 233A demodulates and decodes the basic transmission data in accordance with the predetermined coding scheme and the predetermined modulation scheme. The second demodulation and decoding unit 233B demodulates and decodes the additional transmission data in accordance with a coding scheme and/or modulation scheme lower in the error tolerance compared to the predetermined coding scheme and the predetermined modulation scheme.

If the terminal 200 is under a good propagation environment (that is, in a case of the terminal 200-1), the second demodulation and decoding unit 233B successfully demodulates and decodes the additional transmission data. Thereafter, the basic transmission data and the additional transmission data are utilized in combination by the application processor (reproduction unit). Thus, the terminal 200-1 is capable of utilizing both the basic transmission data and the additional transmission data.

If the terminal 200 is under a poor propagation environment (that is, in a case of the terminal 200-2), the second demodulation and decoding unit 233B does not demodulate and decode the additional transmission data. Thereafter, only the basic transmission data is utilized by the application processor (reproduction unit). Thus, the terminal 200-2 is capable of utilizing only the basic transmission data.

Modification of Fourth Embodiment

In the fourth embodiment, the multiplexing unit 110 multiplexed the basic transmission data and the additional transmission data by the FDM. However, instead of the FDM, a time division multiplexing (TDM) may be used. That is, the multiplexing unit 110 multiplexes the basic transmission data and the additional transmission data in the time region. The other operations are the same as the fourth embodiment described above.

Other Embodiments

In the first embodiment to the fourth embodiment described above, a retransmission control was not specifically mentioned. However, ARQ and/or HARQ may be applied only to the basic transmission, out of the basic transmission data and the additional transmission data. Thereby, the error tolerance in transmitting the basic transmission data can be improved. In this case, the terminal 200 transmits NACK to the base station 100 when failing to decode the basic transmission data, and the base station 100 may retransmit the basic transmission data in response to reception of the NACK.

Alternatively, repetitive transmission may be applied only to the basic transmission data, out of the basic transmission data and the additional transmission data. For example, regarding the basic transmission data, the same data (or data different in the redundancy version applied with the error correction code based on the same data) is repeatedly transmitted, thereby the error tolerance can be improved without Ack/Nack. On the other hand, with respect to the additional transmission data, different additional transmission data is transmitted per data transmission.

Such a retransmission control or repetitive transmission may be carried out in combination with the above-described first embodiment to the fourth embodiment.

Further, two or more embodiments of the above-described first embodiment to fourth embodiment described above may be combined to be carried out.

In the above-described first embodiment to fourth embodiment, a case where the radio transmission system is the mobile communication system is exemplified. However, the radio transmission system may be a system different from the mobile communication system. For example, the radio transmission system may be a wireless LAN system, a broadcasting system or the like.

INDUSTRIAL APPLICABILITY

The present application is useful in the field of communication.

The invention claimed is:

1. A transmission apparatus in a radio transmission system that performs multicast/broadcast transmission, comprising:
   a multiplexing unit configured to multiplex a plurality of types of transmission data transmitted in schemes different in error tolerance; and
   a transmitter configured to transmit multiplexed data obtained by the multiplexing unit, by multicast/broadcast, wherein
   the plurality of types of transmission data includes basic transmission data transmitted, by the transmitter, in a scheme having a first error tolerance and additional transmission data transmitted, by the transmitter, in a scheme having a second error tolerance lower than the first error tolerance,
   the additional transmission data is utilized in a reception apparatus by being combined with the basic transmission data, and
   ARQ and/or HARQ is applied to the basic transmission data only, out of the basic transmission data and the additional transmission data.

2. The transmission apparatus according to claim 1, wherein
   the multiplexing unit comprises:
      a bit combination unit configured to repeatedly generate bit strings including the basic transmission data and the additional transmission data; and
      a modulation unit configured to perform mapping to a symbol for each of the bit strings generated by the bit combination unit by using a predetermined modulation scheme, and the bit combination unit repeatedly includes the identical basic transmission data into the bit strings so that the bit strings including the identical basic transmission data are mapped to a plurality of consecutive symbols.

3. The transmission apparatus according to claim 2, wherein the predetermined modulation scheme is the same as a first modulation scheme used by a reception apparatus under a good propagation environment, and different from a second modulation scheme used by a reception apparatus under a poor propagation environment, and the second modulation scheme is a modulation scheme with a fewer number of bits transmitted per each symbol than the predetermined modulation scheme.

4. The transmission apparatus according to claim 1, comprising:

a first coding unit configured to code the basic transmission data to generate coded basic transmission data; and a second coding unit configured to code the additional transmission data to generate coded additional transmission data, wherein the multiplexing unit comprises:

a bit combination unit configured to generate a bit string including the coded basic transmission data and the coded additional transmission data; and a modulation unit configured to perform mapping of the bit string to a symbol by using a predetermined modulation scheme, and the additional transmission data is applied with a coding scheme lower in error tolerance than a coding scheme applied to the basic transmission data.

5. The transmission apparatus according to claim 1, wherein the multiplexing unit multiplexes the basic transmission data and the additional transmission data in a frequency region, and the additional transmission data is applied with a coding and/or modulation scheme lower in error tolerance than a coding and/or modulation scheme applied to the basic transmission data.

6. The transmission apparatus according to claim 1, wherein the multiplexing unit multiplexes the basic transmission data and the additional transmission data in a time region, and the additional transmission data is applied with a coding and/or modulation scheme lower in error tolerance than a coding and/or modulation scheme applied to the basic transmission data.

7. The transmission apparatus according to claim 1, wherein repetitive transmission is applied to the basic transmission data only, out of the basic transmission data and the additional transmission data.

8. A transmission apparatus in a radio transmission system that performs multicast/broadcast transmission, comprising:

a multiplexing unit configured to multiplex a plurality of types of transmission data transmitted in schemes different in error tolerance; and a transmitter configured to transmit multiplexed data obtained by the multiplexing unit, by multicast/broadcast, wherein the plurality of types of transmission data includes basic transmission data transmitted, by the transmitter, in a scheme having a first error tolerance and additional transmission data transmitted, by the transmitter, in a scheme having a second error tolerance lower than the first error tolerance, the additional transmission data is utilized in a reception apparatus by being combined with the basic transmission data, the multiplexing unit comprises:

a bit combination unit configured to repeatedly generate bit strings including the basic transmission data and the additional transmission data; and a modulation unit configured to perform mapping to a symbol for each of the bit strings generated by the bit combination unit by using a predetermined modulation scheme, the bit combination unit repeatedly includes the identical basic transmission data into the bit strings so that the bit strings including the identical basic transmission data are mapped to a plurality of consecutive symbols, and the bit combination unit fixes a bit position of the basic transmission data in the bit string at a specific bit position so that the plurality of consecutive symbols are arranged at signal points adjacent on an IQ plane.

9. A reception apparatus in a radio transmission system that performs multicast/broadcast transmission, comprising:

a receiver configured to receive multiplexed data obtained by multiplexing a plurality of types of transmission data transmitted in a scheme different in error tolerance, wherein the multiplexed data is transmitted by multicast/broadcast from a transmission apparatus, the plurality of types of transmission data includes basic transmission data transmitted, by the transmission apparatus, in a scheme having a first error tolerance and additional transmission data transmitted, by the transmission apparatus, in a scheme having a second error tolerance lower than the first error tolerance, the additional transmission data is utilized by being combined with the basic transmission data, and ARQ and/or HARQ is applied to the basic transmission data only, out of the basic transmission data and the additional transmission data.

10. The reception apparatus according to claim 9, wherein the basic transmission data and the additional transmission data are multiplexed in a power region, a transmission power applied to the additional transmission data is lower than a transmission power applied to the basic transmission data, when the reception apparatus is under a good propagation environment, the reception apparatus comprises:

a separation unit configured to separate the multiplexed data into the basic transmission data and the additional transmission data; and a decoding unit configured to decode the basic transmission data and the additional transmission data separated by the separation unit, and the separation unit is configured to execute:

a first process of extracting the basic transmission data from the multiplexed data while considering the additional transmission data as noise; and a second process of extracting the additional transmission data included in the multiplexed data by canceling the basic transmission data included in the multiplexed data with a use of a replica of the basic transmission data.

11. The reception apparatus according to claim 9, wherein the multiplexed data includes a symbol obtained by a predetermined modulation scheme, the symbol is mapped to a bit string including the basic transmission data and the additional transmission data, and a plurality of consecutive symbols are mapped to the bit string including the identical basic transmission data.

12. The reception apparatus according to claim 11, wherein when the reception apparatus is under a good propagation environment, the reception apparatus comprises:

a demodulation unit configured to demodulate the bit string for each of the symbols by using the predetermined modulation scheme; and a separation unit configured to separate the bit string into the basic transmission data and the additional transmission data.

13. The reception apparatus according to claim 9, wherein the multiplexed data includes a symbol obtained by a predetermined modulation scheme, the symbol is mapped to a bit string including coded basic transmission data obtained by coding the basic transmission data and coded additional transmission data obtained by coding the additional transmission data, and the additional transmission data is applied with a coding scheme lower in error tolerance than a coding scheme applied to the basic transmission data.

14. The reception apparatus according to claim 13, comprising:

a demodulation unit configured to demodulate the bit string for each of the symbols by the predetermined modulation scheme;

a separation unit configured to separate the bit string into the coded basic transmission data and the coded additional transmission data;

a first decoding unit configured to decode the coded basic transmission data; and a second decoding unit configured to decode the coded additional transmission data.

15. The reception apparatus according to claim 9, wherein the basic transmission data and the additional transmission data are multiplexed in a frequency region, and the additional transmission data is applied with a coding and/or modulation lower in error tolerance than a coding and/or modulation scheme applied to the basic transmission data.

16. The reception apparatus according to claim 9, wherein the basic transmission data and the additional transmission data are multiplexed in a time region, and the additional transmission data is applied with a coding and/or modulation lower in error tolerance than a coding and/or modulation scheme applied to the basic transmission data.

17. The reception apparatus according to claim 9, wherein repetitive transmission is applied to the basic transmission data only, out of the basic transmission data and the additional transmission data.

18. A reception apparatus in a radio transmission system that performs multicast/broadcast transmission, comprising:

a receiver configured to receive multiplexed data obtained by multiplexing a plurality of types of transmission data transmitted in a scheme different in error tolerance, wherein the multiplexed data is transmitted by multicast/broadcast from a transmission apparatus, the plurality of types of transmission data includes basic transmission data transmitted, by the transmission apparatus, in a scheme having a first error tolerance and additional transmission data transmitted, by the transmission apparatus, in a scheme having a second error tolerance lower than the first error tolerance, the additional transmission data is utilized by being combined with the basic transmission data, the multiplexed data includes a symbol obtained by a predetermined modulation scheme, the symbol is mapped to a bit string including the basic transmission data and the additional transmission data, a plurality of consecutive symbols are mapped to the bit string including the identical basic transmission data, when the reception apparatus is under a poor propagation environment, the reception apparatus comprises:

a composite operation unit configured to generate a composite symbol by performing a composite operation on the plurality of consecutive symbols; and a demodulation unit configured to demodulate the composite symbol in accordance with the second modulation scheme different from the predetermined modulation scheme, wherein the second modulation scheme is a modulation scheme with a fewer number of bits transmitted per each symbol than the predetermined modulation scheme, and the plurality of consecutive symbols are arranged at a signal point adjacent on an IQ plane.

* * * * *